US009277017B2

(12) United States Patent
Burch et al.

(10) Patent No.: US 9,277,017 B2
(45) Date of Patent: Mar. 1, 2016

(54) TECHNIQUES FOR DEVICE INDEPENDENT SESSION MIGRATION

(71) Applicant: NetIQ Corporation, Provo, UT (US)

(72) Inventors: Lloyd Leon Burch, Payson, UT (US); Baha Masoud, Orem, UT (US); Michael F. Angelo, Spring, TX (US)

(73) Assignee: NetIQ Corporation, Provo, UT (US)

( * ) Notice: Subject to any disclaimer, the term of this patent is extended or adjusted under 35 U.S.C. 154(b) by 246 days.

(21) Appl. No.: 13/663,736

(22) Filed: Oct. 30, 2012

(65) Prior Publication Data

US 2014/0122730 A1 May 1, 2014

(51) Int. Cl.
H04L 29/08 (2006.01)
H04L 29/06 (2006.01)

(52) U.S. Cl.
CPC .......... *H04L 67/148* (2013.01); *H04L 63/0807* (2013.01); *H04L 67/146* (2013.01)

(58) Field of Classification Search
CPC ..... H04L 67/14; H04L 67/142; H04L 67/143; H04L 67/146; H04L 67/148; H04L 67/22; H04L 65/10; H04L 65/1066; H04L 65/1073; H04L 65/1083; H04L 63/10
USPC .......................... 709/203, 217, 223, 227–229
See application file for complete search history.

(56) References Cited

U.S. PATENT DOCUMENTS

| 6,615,264 | B1 * | 9/2003 | Stoltz ................. H04L 67/1002 709/225 |
| 6,877,111 | B2 | 4/2005 | Sharma et al. |
| 7,502,824 | B2 | 3/2009 | Kaluskar et al. |
| 7,552,218 | B2 | 6/2009 | Kaluskar et al. |
| 7,587,400 | B2 | 9/2009 | Bastawala et al. |
| 7,646,755 | B2 | 1/2010 | Kurlander et al. |
| 8,116,685 | B2 * | 2/2012 | Bregman-Amitai et al. 455/41.2 |
| 8,166,176 | B2 | 4/2012 | Kumar et al. |
| 8,228,861 | B1 | 7/2012 | Nix |
| 8,234,236 | B2 | 7/2012 | Beaty et al. |
| 8,255,690 | B2 | 8/2012 | Wiseman et al. |
| 8,738,699 | B2 * | 5/2014 | Hovdal et al. ................. 709/204 |
| 2003/0055977 | A1 * | 3/2003 | Miller ................... H04L 67/148 709/227 |
| 2005/0038828 | A1 * | 2/2005 | Kaluskar ............... H04L 67/148 |
| 2008/0059639 | A1 * | 3/2008 | Zhang ........................... 709/227 |
| 2008/0084867 | A1 * | 4/2008 | Foti et al. ...................... 370/352 |
| 2009/0210536 | A1 * | 8/2009 | Allen et al. .................... 709/227 |
| 2009/0259758 | A1 * | 10/2009 | Chen et al. ..................... 709/228 |
| 2010/0268828 | A1 * | 10/2010 | Pahlavan ............... H04L 67/148 709/227 |
| 2011/0023096 | A1 | 1/2011 | Xiao et al. |
| 2011/0029999 | A1 * | 2/2011 | Foti ................................. 725/25 |
| 2011/0153854 | A1 | 6/2011 | Chickering |
| 2011/0231784 | A1 | 9/2011 | Meng et al. |
| 2011/0231923 | A1 | 9/2011 | Bollay et al. |
| 2012/0023167 | A1 * | 1/2012 | Hovdal et al. ................. 709/204 |
| 2012/0066373 | A1 | 3/2012 | Ochoa et al. |

(Continued)

*Primary Examiner* — Ramy M Osman

(74) *Attorney, Agent, or Firm* — Schwegman Lundberg & Woessner, P.A.

(57) ABSTRACT

Techniques for device independent session migration are presented. A secure mechanism is presented for a target device to receive a current authenticated communication session from an original device with minimal user interaction while automated security is enforced during session migration. In an embodiment, the target device is a mobile device and the original device is a desktop; the target device captures a data glyph that is visually presented on a display of the original device and the data glyph is then seamlessly communicated to a server manager for authentication and session migration.

19 Claims, 4 Drawing Sheets

(56) References Cited

U.S. PATENT DOCUMENTS

| | | |
|---|---|---|
| 2012/0198531 A1* | 8/2012 | Ort et al. .......................... 726/7 |
| 2012/0201361 A1 | 8/2012 | Angel et al. |
| 2013/0290494 A1 | 10/2013 | Goudarzi et al. |
| 2013/0314491 A1* | 11/2013 | Vivekanandan et al. ... 348/14.08 |
| 2013/0318249 A1* | 11/2013 | McDonough ......... H04L 67/148 709/228 |
| 2014/0059344 A1 | 2/2014 | Branton et al. |
| 2014/0113556 A1 | 4/2014 | Kotecha |
| 2014/0122731 A1 | 5/2014 | Burch et al. |
| 2014/0156854 A1 | 6/2014 | Gaetano, Jr. |

* cited by examiner

TECHNIQUES FOR DEVICE INDEPENDENT SESSION MIGRATION

BACKGROUND

As the industry increases the use of mobile devices, there is a problem when users work in a mixed environment of desktop machines and mobile devices. There are times that a user is working on his/her desktop machine and needs to continue a browser session on his/her mobile device. The information on the desktop is many times in the form of protected Hypertext Markup Language (HTML) page/document that is being viewed by the desktop browser. The page/document may be secured and protected by an authentication mechanism that was earlier achieved by the user, such as a name and password pair, Kerberos, or Windows® NT Local Area Network (LAN) Manager (NTLM). This means that simply copying the Uniform Resource Locator (URL) link for the document onto another device will not give the user access on that mobile device. In addition, under current approaches in the industry there is no mechanism to transfer (or migrate) the security and Access Control List (ACL) rights associated with the page/document securely and in a trusted manner to a mobile device.

Moreover, session transfer should be done transparently, so that it does not require the user to re-authenticate on the mobile device, which would be perceived as a huge hassle to the user. Both the location of the document and the rights to the document need to be transferred (or accessible) to the mobile device. In addition, there are times when authenticated users entire sessions may need to be transferred from their desktops to their mobile devices. In solving this problem, it is noted that any substantial changes to existing/legacy web services and/or mobile devices are likely not feasible and will likely prevent any significant adoption of device independent session migration techniques. In addition, security is of substantial import, such that unauthorized viewing or modifications to transferred sessions are eliminated. It is also critical that the session migration rights be controlled.

In summary, any technique addressing the portability and migration of a secure session needs to be able to transfer a complete authenticated session with access rights to mobile device in an optimal manner that is as transparent and seamless to the users but also in a manner that is secure and trusted.

SUMMARY

Various embodiments of the invention provide techniques for device independent session migration. In an embodiment, a method for session migration is presented.

Specifically, a token is acquired by a device for a session between a resource and a principal that is active on a different device. The token is directly acquired from the different device during the session. Next, the device sends the token to a server session manager. Finally, the session between the resource and the principal is established on or migrated to the device based actions of the server session manager.

DETAILED DESCRIPTION

Figure 1:
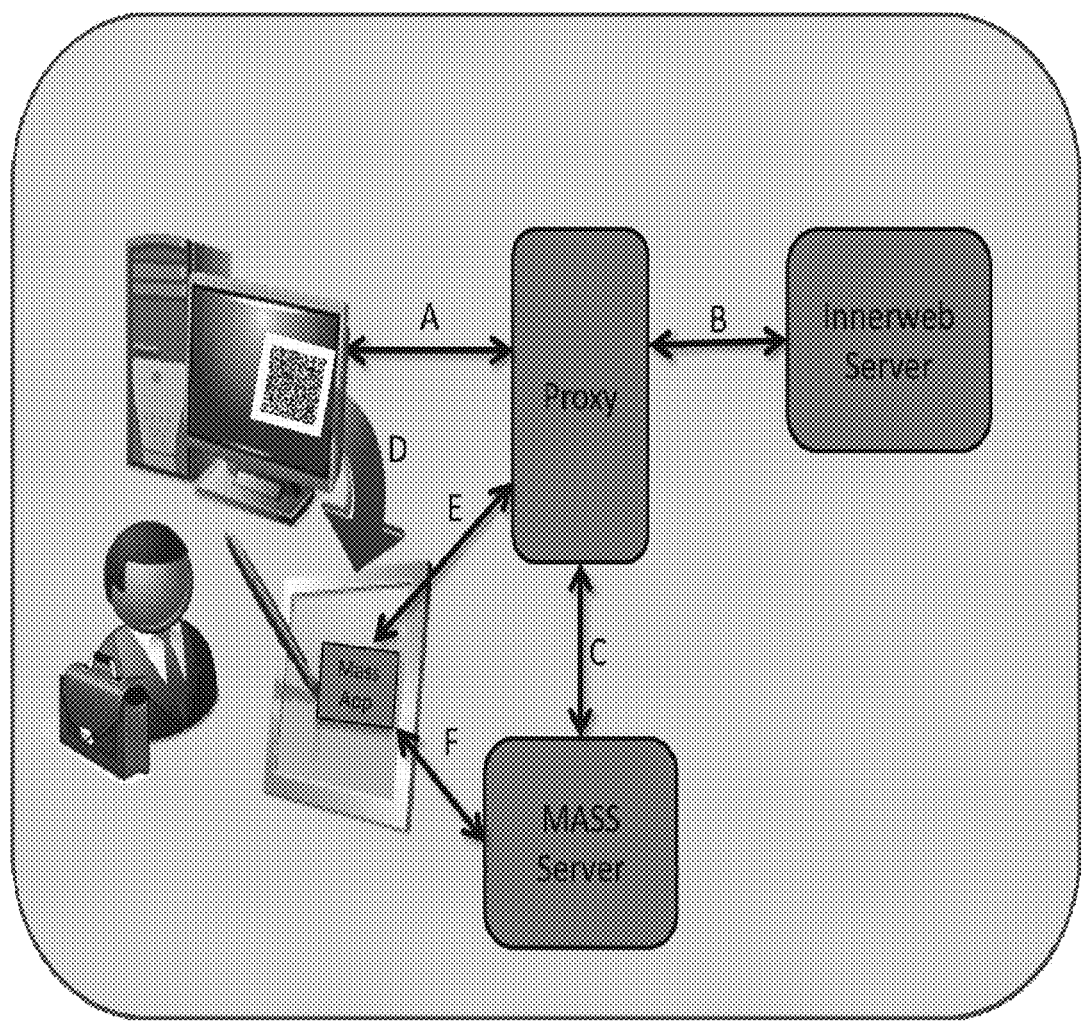
FIG. 1 is a diagram depicting a technique for session migration, according to an example embodiment presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram depicting a technique for session migration, according to an example embodiment presented herein. The technique includes a variety of components that is implemented, programmed, and resides within a non-transitory machine-readable storage medium that executes on one or more processors of a network. The network may be wired, wireless, or a combination of wired and wireless.

It is noted that the components and interactions of the FIG. 1 are presented for purposes of illustration and that other arrangements including more or less components are possible without departing from the teachings provided herein.

The components of the FIG. 1 are discussed within the context of a working example to demonstrate how some embodiments of the invention work and how a user can use those embodiments. The following description and analysis provided with respect to the FIG. 1, are illustrative and are not intended to depict all foreseeable embodiments of the invention, and therefore should not be construed as limitations.

John (a user) logins in to his desktop in the morning and begins using his enterprise's Intranet, as he does every day. The enterprise's Intranet is a protected resource and he only has access because he is authenticated. While browsing to the different pages he needs to leave his office and go to a meeting elsewhere but, he is not finished using the Intranet resources; so, he grabs his mobile device (an iPad® in this case) and selects the Mobile Access Snap Shot (MASS) application (previously installed on his iPad®). He, then, points the camera on the iPad® at his desktop's display screen and the next thing he sees is the same browser session that was on his desktop, on his mobile device (seamlessly migrated to his iPad®). He can now continue what he was doing on his desktop using his iPad® as he goes off to his scheduled meeting.

The components and the processing for those components (the FIG. 1) are now discussed to describe how John's session is seamlessly and securely migrated from his desktop to his iPad® with seemingly only two clicks (accessing the MASS application and taking a picture of the data glyph on the desktop).

Consider a following specific situation for purposes of illustration.

User Need

The user starts his day by authenticating and accessing protected resources on his enterprise's Intranet via his desktop browser. After some time passes, he needs to go to a meeting but needs to finish up what he was doing on his iPad®.

User Experience

The user selects the MASS application on his iPad®, points the camera of the iPad® toward the desktop screen and now is running the browser on iPad® that is logged-in on the same page the desktop was logged into.

This allows John to continue working on his iPad® as he goes to his meeting. He did not need to type any URL's or passwords, all he did was select an icon and point the camera on his iPad® at the desktop screen to capture a data glyph (such as a Quick Response (QR) code).

Process Flow

Access

1) The user authenticates to a protected enterprise-Intranet service as he normally does, and begin browsing/using protected resources (A-B). As the HTML pages are accessed through a proxy to the browser (B-A), the proxy injects value-added "visible" data into the HTML pages in the form of a data glyph. The data glyph includes information about the URL that is being displayed and an access token that can be used to allow access to the page or session occurring at present on the desktop of the user.

2) The format of the data glyph can be a QR code, and is encoded as an image, which is displayed on the screen. Albeit, it is noted that other implementations or embodiments on this format can be used without departing from the teachings presented herein.

3) When the user wishes to continue the work he/she was doing on his/her desktop, on their mobile device (i.e. an iPad®, smart phone, Android® tablet, etc.), he/she selects the MASS application (installed on the mobile device), points the camera of the mobile device at the desktop screen. (The MASS application uses the camera to read the data glyph (QR coded data) from the desktop screen into the iPad® (D).) The QR data is then decoded, validated, and potentially encrypted, by the iPad® (via the "Mass Application") and then sent to the "MASS" server (F). The iPad® "MASS" application may also prove its identity (via signing) and/or encrypt the data sent to the MASS server if configured (F).

4) The MASS server validates the access token. The token may have a time to live and scope of access. If required, by policy, the identity of the iPad® device may also be validated. If the URL is in the scope of the access token and all other access policies are met, the MASS server builds a Token for the Proxy. An example is an Open Standard for Authentication (OAuth) token. This token is then sent back to the Mass application (F). The proxy token and the URL(s), the desktop browser was viewing are used to spawn a new browser session on the iPad®. The spawned iPad® browser makes a Hyper Text Transfer Protocol (HTTP) request to proxy with a valid proxy access token included (E).

5) The proxy sends the token to the MASS server to be validated (C). If the token is valid, the browser running on the iPad® is allowed access to the user's enterprise Intranet session.

Device Registration

The above example shows how the users access a system using various components of the invention and assumes that the receiving device (target of session migration or "target device") is trusted or that no device trust is needed. When the iPad® Mass application sends the access token to the MASS server (step 2 above), the iPad® may be required to validate its device identity to the MASS server to be trusted. The next example shows how the device becomes trusted.

1) In step (2) above, if the iPad® device must be trusted and it is not trusted, the MASS server may respond to the Mass application (F) with a request register the device.

2) The Mass application prompts the user to enter his/her credentials. The Mass application then generates an authentication token. The token can include a Public/Private key pair or a secret key, and device ID.

3) The secret key or the public part of the Public/Private key pair, the device ID, and the user credentials are then sent to the MASS server, via the Mass application, to be validated.

4) If the user credentials are valid, the device is registered and the device can use the private key or secret for other subsequent requests.

Device (iPad) De-Registration

If the user has had a device lost or stolen he/she may de-register the device from any browser application as follows.

1) The user enters the URL of the MASS service (proxy and/or MASS server) into any browser and is presented with a menu of choices. He/she selects a de-register a device option from the menu of choices.

2) If the user is not already authenticated, he/she is prompted for his/her credentials. If the credentials are valid, the MASS server shows a list of devices registered to the user.

3) He/She selects the device and can now choose to "Delete" or "Disable" the device. At this point, the device is no longer able to use the MASS server as a trusted device known to the MASS server.

As discussed above and as discussed in greater detail and specificity below, the teachings herein provide for user simplicity and security during device session migration, such benefits include, but are not limited to:

1) allowing users to transparently transfer a communication and associated work session from one device (original device) to another device (target device).

2) allowing users to present access credentials to a third party—permitting security tokens to be transferred from one screen of an original device to another device without any electronic connection, only visual;

3) using tokens to validate:
  A) that a target device is close to the a authenticated system (in view—authenticated system being the original device having the current session being migrated);
  B) that the view of the authenticated system is current, not a picture used at a later time. The tokens are dynamic and have limited time to be used;
  C) that the target device is a trusted device; and
  D) enables multifactor authentication with a single button of the device;

4) uses a proxy to add value (data glyph) to existing web services (by injecting the data glyph into their presented views);
  A) no changes are required to the existing web service or browser; and
  B) the injection of the tokens (data glyphs) is done as needed and when needed;

5) the token generation is dynamic;
  A) the tokens can be different (customized) for every user session logged in, even for a same resource being viewed;
  B) the time that the tokens are valid is controlled and customizable;
  C) the token can allow others to use their own devices to view the URL page, based on policy evaluation; and
  D) the token can give access rights to an URL for a limited period of time.

Figure 2:
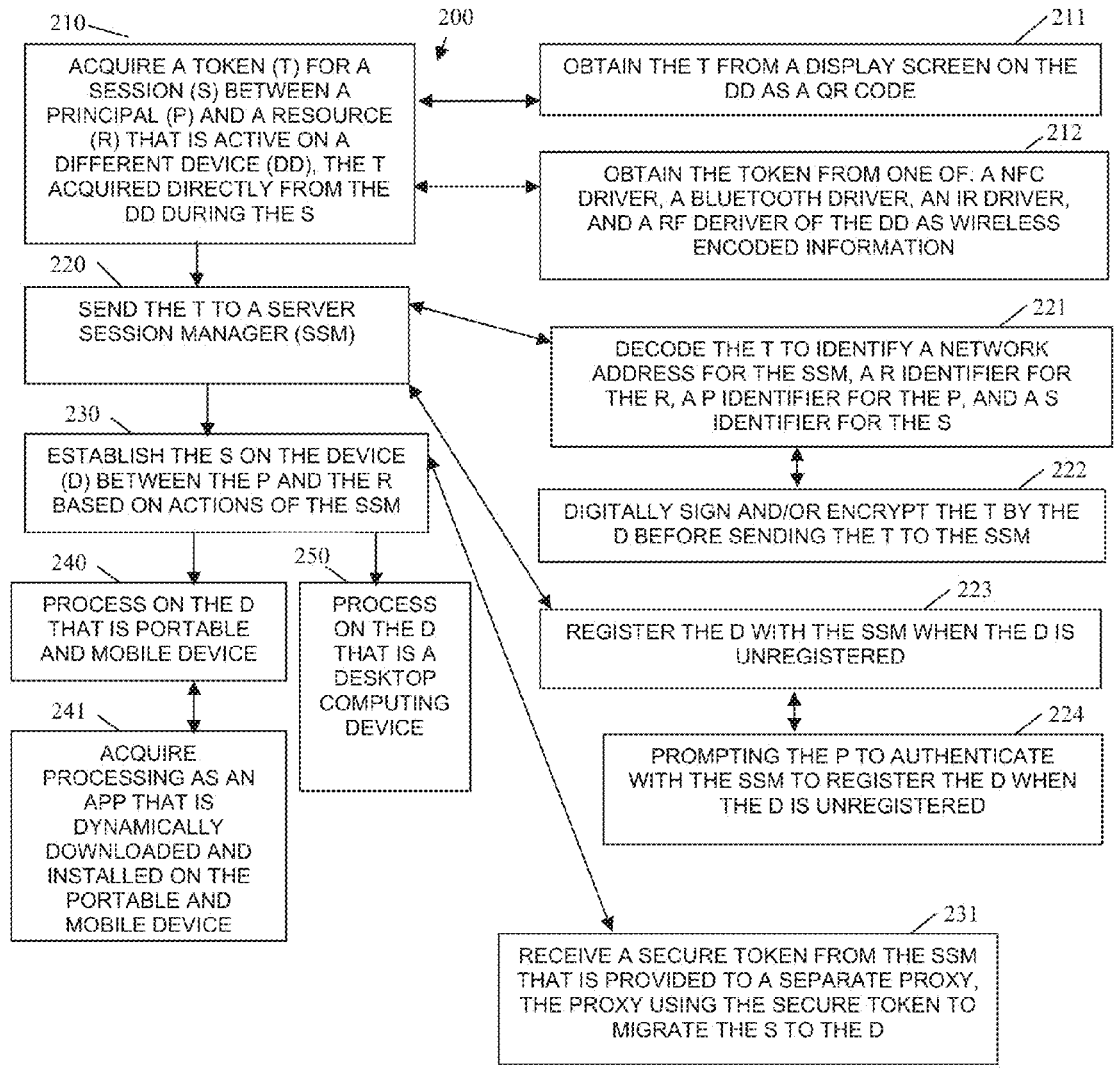
FIG. 2 is a diagram of a method for session migration, according to an example embodiment presented herein.

FIG. 2 is a diagram of a method 200 for session migration, according to an example embodiment presented herein. The method 200 (herein after referred to as "device session manager") is implemented, programmed, and resides within a non-transitory machine-readable storage medium that executes on one or more processors of a device and is operational over a network. The network may be wired, wireless, or a combination of wired and wireless.

The device session manager provides the processing perspective of an app on a user's device, such as the "Mass App" discussed above from with the FIG. 1. The device session manager interacts with a proxy and/or a server (such as the "Proxy" and "Mass Server" presented above with the FIG. 1). The processing perspective of the Proxy and/or Server is provided below with the discussion of the FIG. 3.

At 210, the device session manager acquires a token for a session between a resource and a principal that is active on a different device from the device that is processing the instance of the device session manager. The token is acquired directly from the different device during the session.

Here, the token is encoded information about the secure and authenticated session between the principal and the resource. The principal can be a user or an automated service. The resource is a remote network-based service or suite of services.

In an embodiment, the session occurs on a desktop computing device and the device session manager is processing as an app on a mobile and portable device of the principal, who is a user.

The token can be acquired in a number of manners.

For example, at 211, the device session manager obtains the token from a display screen of the different device as a Quick Response (QR) code. This scenario was discussed in detail above with reference to the FIG. 1. Moreover, it is noted that any data glyph or barcode can be used and that a QR code is but one embodiment.

In an alternative case, at 212, the device session manager obtains the token from one of: a Near Field Communication (NFC) driver, a Bluetooth driver, an Infrared driver, and a Radio Frequency (RF) driver of the different device as wireless encoded information. In this embodiment, the token is not visible to the principal on the different device but the different device can discover or transmit the wireless encoded token such that the device can discover it via one or more wireless technologies. Notice that each of such technologies have a limited geographic range from the different device; this provides security because only a device having the device session manager can recognize the wireless transmission when such device is within that limited geographic range of the different device.

At 220, the device session manager sends the token to a server session manager. This was discussed above with reference to the FIG. 1. It is noted that the server session manager may include both the functions of the proxy and the MASS server as discussed above with reference to the FIG. 1. Although as discussed in the FIG. 1, in some embodiments the two entities are separate from one another with separate functions as presented in the FIG. 1.

According to an embodiment, at 221, the device session manager decodes the token to identify a network address for the server session manager, a resource identifier for the resource, a principal identifier for the principal, and a session identifier for the active session. Armed with this information the device session manager can now communicate with the server session manager to have the session migrated on behalf of the principal from the different device (device having the active session) to the device that is processing the device session manager.

Continuing with the embodiment of 221 and at 222, the device session manager digitally signs and/or encrypts the token by the device and/or the device session manager before sending the token to the server session manager. It is noted that the instance of the device session manager may identify the device, such that the signing occurs via the device session manager but identifies the device. Again, this adds a level of security and trust to the session migration that is taking place by ensuring that the device having the device session manager is known and acquired the token within a configured proximity to the different device where the session is active.

In an embodiment, at 223, the device session manager registers the device with the server session manager when the device is unregistered. That is, the device and the instance of the device session manager processing on the device may not have yet interacted with the server session manager, such that secure registration of that device is needed.

Continuing with the embodiment of 223 and at 224, the device session manager prompts the principal to authenticate with the server session manager to register the device when the device is unregistered. In other words, the principal has to sign into his registered user account to dynamically register the device. The sign in occurs on the device that is being registered.

The scenarios and available security options of 223 and 224 were discussed above with reference to the FIG. 1.

At 230, the device session manager establishes the session between the resource and the principal based on actions of the server session manager. That is, the server session manager dynamically and near seamlessly interacts with the resource and/or a proxy of the resource to acquire information that the device session manager can use to re-establish or migrate the session to the device.

According to an embodiment, at 231, the device session manager receives a secure token from the server session manager that is provided to a separate proxy by the device session manager. The separate proxy then uses the secure token to actively migrate the session to the device having the instance of the device session manager.

In an embodiment, at 240, the device session manager is processed on the device, which is a portable and mobile device, such as a tablet, smart phone, and the like.

Continuing with the embodiment of 240 and at 241, the device session manager is acquired as an app that is dynamically downloaded and installed on the portable and mobile device. This can be done via an app store or via any other online vendor/distributor of the device session manager.

In another case, at 250, the device session manager is processed on a device, which is a desktop computing device. So, it may be that the principal (user) is active on a portable device and wants to migrate to his/her desktop device in this embodiment.

The device session manager processes as an independent instance on an original device (discussed with respect to the FIG. 2 as the different device) and as another independent instance on a target device (discussed with respect to the FIG. 2 as the device having the device session manager). The target device is the one that is receiving a migrated session and the original device is the one that has the session active before migration.

It is noted that the target and original devices are relative based on the transaction, such that in some cases as described in the FIG. 1 the original device is a desktop computing device and the target device is a mobile device; but the other scenario as discussed herein with the FIG. 2 is capable as well where the original device is the mobile device and the target device receiving a migrated session is the desktop computing device.

Figure 3:
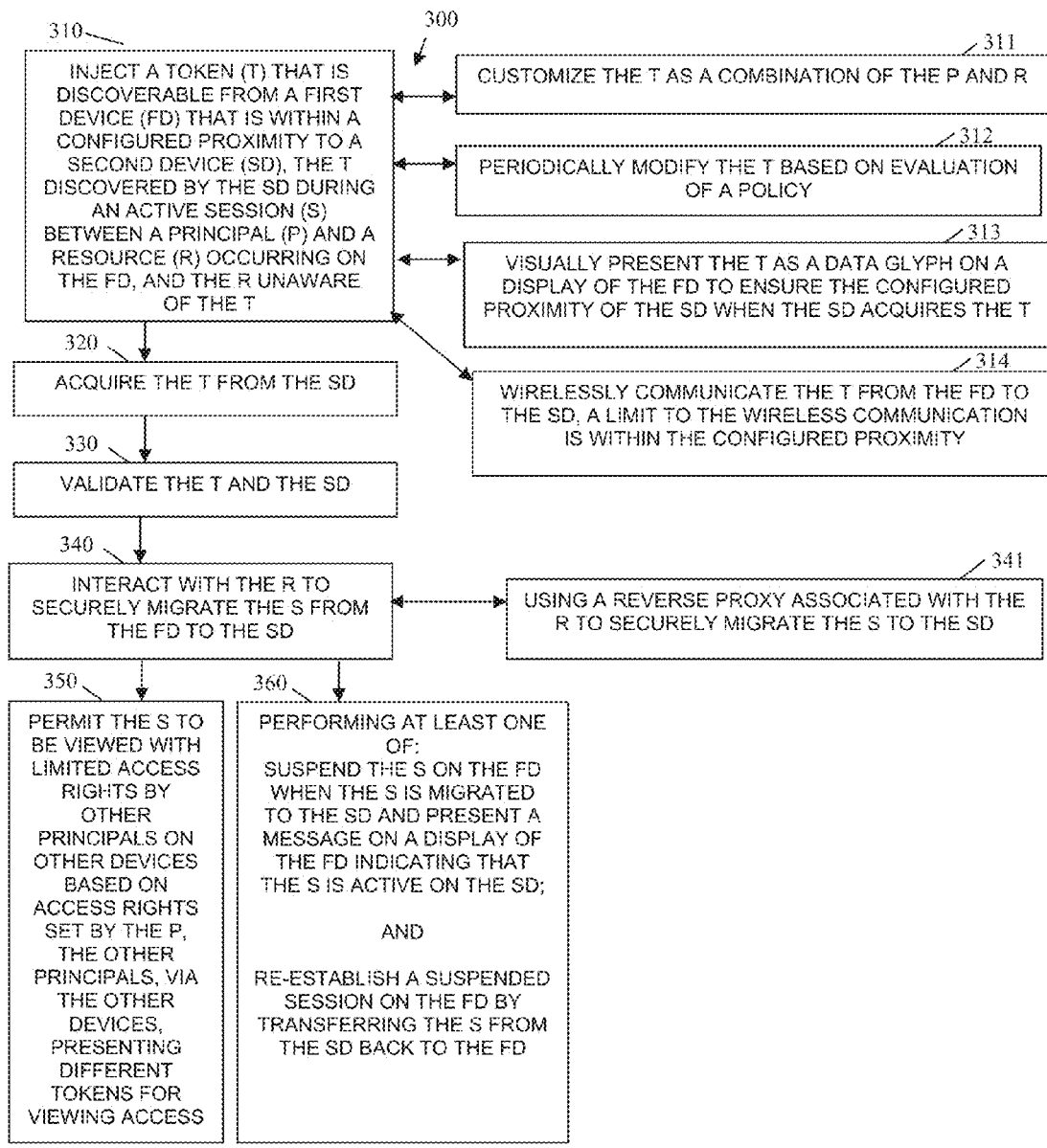
FIG. 3 is a diagram of another method for session migration, according to an example embodiment.

FIG. 3 is a diagram of another method 300 for session migration, according to an example embodiment. The method 300 (herein after referred to as "server session manager") is implemented, programmed, and resides within a non-transitory machine-readable storage medium that executes on one or more processors of a server and is operational over a network. The network may be wired, wireless, or a combination of wired and wireless.

The server session manager is presented from the perspective of device independent session migration processing occurring on a server and/or proxy. Some of the actions of the server session manager were discussed above with reference to the FIG. 1 (discussion of the proxy and/or the "Mass Server"). The server session manager interacts with the device session manager of the FIG. 2 and with a legacy resource (existing service) from where a session is being migrated from an original device to a target device.

At 310, the server session manager injects a token that is discoverable from a first device (original device), which is within a configurable proximity distance to a second device (target device). The token is discovered by the second device during an active session between a principal (user or automated service) and a resource (remote network service or suite of services) occurring on the first device. It is also noted that he resource is unaware of the token and its presence from the session of the first device.

According to an embodiment, at 311, the server session manager customizes the token as a combination of the principal and the resource. So, each combination of a particular principal and a particular resource can have its own unique token or token format (other unique information may be present in the token as well, such as a time element as discussed above with respect to the FIG. 1).

In another case, at 312, the server session manager periodically modifies he token based on evaluation of a policy. So, an administrator or automated administrative service can custom define a policy that is dynamically evaluated to determine when the token is modified within an active session. This can be as simple as every so many seconds or minutes or as complex as a series of actions taken during the session in combination with time and other custom-defined factors.

In yet another situation, at 313, the server session manager visually presents the token as a data glyph on a display of the first device to ensure the configured proximity distance of the second device when the second device acquires the token.

In an alternative case, at 314, the server session manager wirelessly communicating the token from the first device to the second device, where a limit to the wireless communication is within the configured proximity distance. This was discussed above with reference to the FIG. 2, such wireless technologies can include, by way of example, NFC, Bluetooth, IR, RF, and the like.

At 320, the server session manager acquires the token from the second device (target device). So, the second device was able to acquire the server session manager injected token from the active session on the first device.

Next, at 330, the server session manager validates the token and the second devices. Techniques for achieving this were discussed in detail above with reference to the FIGS. 1 and 2.

At 340, the server session manager interacts with the resource to securely migrate the active session from the first device to the second device. Again, the details for achieving this were presented above with respect to the FIGS. 1 and 2 (more particularly the FIG. 1—where the actions of the proxy and the Mass Server can both be subsumed herein as the server session manager).

According to an embodiment, at 341, the server session manager uses a reverse proxy associated with the resource to securely migrate the active session to the second device.

In an embodiment, at 350, the server session manager permits the active session to be viewed with limited access rights by other principals on other devices based on access rights set by the principal. The other principals, via the other devices, presenting different tokens for viewing access. So, a form of collaboration can be defined by the principal for the session and access rights defined by the principal; in such an embodiment, the other principals may be in proximity to the first device and based on their devices the token acquired is altered to identify the other principals. In other cases, it may be that the other principals receive an electronic communication having the token from the principal. In fact, a variety of techniques can be used to provide the other tokens for collaboration in the session.

In another circumstance, at 360, the server session manager suspends the active session on the first device when the active session is successfully migrated to the second device and then presents a message on a display of the first device indicating that the active session is active on the second device. This may be particular useful to a user that forgets the session is active on another device when he returns back to his original device having the session initially. It may also be that the session occurring on the second device is presented in view only mode on the first device once migrated to the second device. In fact, what occurs on the first device with respect to the session can be dictated by policy defined by the user (principal). Complimentary to the processing at 360, the server session manager can also re-establish any suspended session on the first device by transferring the active session from the second device back to the first device. Again, this complimentary processing may occur with the first embodiment (at 360) discussed above or may occur in place of the first embodiment of the processing 360.

Figure 4:
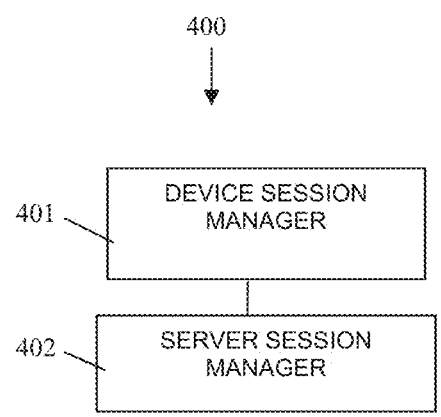
FIG. 4 is a diagram of a session migration system, according to an embodiment.

FIG. 4 is a diagram of a session migration system 400, according to an embodiment. The components of the session migration system 400 are implemented as executable instructions that reside within memory and/or non-transitory computer-readable storage media and those instructions are executed by one or more devices. The components and the devices operational over a network and the network can be wired, wireless, or a combination of wired and wireless.

According to an embodiment, the session migration system 400 implements, inter alia, the features of the FIGS. 1-3.

The session migration system 400 includes a device session manager 401 and a server session manager 402. Each of these and their interactions with one another will not be discussed in turn.

The session migration system 400 includes a target device having memory configured with device session manager 401. Example processing associated with the device session manager 401 was presented above in detail with reference to the FIGS. 1 and 2.

The device session manager 401 is configured to capture a token within a configured proximity distance from an active session between a principal and a resource occurring on an original device. The device session manager 401 is also configured to communicate that token to the server session manager 402 (as discussed above with respect to the FIGS. 1 and 2).

The session migration system 400 also includes a server having memory configured with server session manager 402. Example processing associated with the server session manager 402 was presented above in detail with reference to the FIGS. 1 and 3.

The server session manager 402 is configured to validate the token and the target device when received from the target device. The server session manager 402 is also configured to interact with the resource to migrate the active session from the original device to the target device (this may be as simple as acquiring a retained security token for the session from a proxy monitoring the resource, such that the resource is completely unaware of the migration and actions of the entities involved).

According to an embodiment, the server session manager 402 is also configured to inject the token into the active session for discovery by the device session manager 401 on the target device within the configured proximity distance.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by a device configured to perform the method, comprising:

acquiring, by the device, a token for a session between a resource and a principal that is active on a different device, the token acquired directly from the different device during the session by the device, and wherein generating, by a server session manager, the token that includes restrictions for a time to live and a scope of access with respect to the session, and inserting, by the server session manager, the token into the different device where the device acquires the token, and wherein the device is a mobile device operated by the principal;

sending, by the device, the token to the server session manager; and establishing, on the device, the session between the resource and the principal and based on actions of the server session manager, and terminating the session on the device and preventing the device from accessing the session and other subsequent sessions when the principal authenticates to the server session manager and deregisters the mobile device for access to the session and the other subsequent sessions.

2. The method of claim 1, wherein acquiring further includes obtaining the token from a display screen of the different device as a Quick Response (QR) code.

3. The method of claim 1, wherein acquiring further includes obtaining the token from one of: a Near Field Communication (NFC) driver, a Bluetooth driver, an Infrared driver, and a Radio Frequency (RF) driver of the different device as wireless encoded information.

4. The method of claim 1, wherein sending further includes decoding the token to identify a network address for the server session manager, a resource identifier for the resource, a principal identifier for the principal, and a session identifier for the session.

5. The method of claim 4, wherein decoding further includes digitally signing and/or encrypting the token by the device before sending the token to the server session manager.

6. The method of claim 1, wherein sending further includes registering the device with the server session manager when the device is unregistered.

7. The method of claim 6, wherein registering further includes prompting the principal to authenticate with the server session manager to register the device when the device is unregistered.

8. The method of claim 1, wherein establishing further includes receiving a secure token from the server session manager that is provided to a separate proxy, the proxy using the secure token to migrate the session to the device.

9. The method of claim 1, wherein the method is acquired from as an app that is dynamically downloaded and installed on the mobile device.

10. The method of claim 1 further comprising, processing the method on the device that is a desktop computing device.

11. A method implemented in a non-transitory machine-readable storage medium and processed by a server configured to perform the method, comprising:

injecting, by the server, a token that is discoverable from a first device that is within a configured proximity to a second device, the token discovered by the second device during an active session between a principal and a resource occurring on the first device, and the resource unaware of the token, and the token including restrictions for a time to live and a scope of access with respect to the active session, and wherein the second device is a mobile device;

acquiring, by the server, the token from the second device;

validating, by the server, the token and the second device;

interacting, by the server, with the resource to securely migrate the active session from the first device to the second device device; and receiving, by the server, a subsequent successful authentication of the principal from a different device than the second device and providing an interface for the principal to terminate the active session and deregister the second device for access to the active session and other subsequent active sessions.

12. The method of claim 11, wherein injecting further includes customizing the token to a combination of the principal and the resource.

13. The method of claim 11, wherein injecting further includes visually presenting the token as a data glyph on a display of the first device to ensure the configured proximity of the second device when the second device acquires the token.

14. The method of claim 11, wherein injecting further includes wirelessly communicating the token from the first device to the second device, wherein a limit to the wireless communication is within the configured proximity.

15. The method of claim 11, wherein interacting further includes using a reverse proxy associated with the resource to securely migrate the active session to the second device.

16. The method of claim 11 further comprising, permitting the active session to be viewed with limited access rights by other principals on other devices based on access rights set by the principal, the other principals via the other devices presenting different tokens for viewing access.

17. The method of claim 11 further comprising at least one of:

suspending the active session on the first device when the active session is migrated to the second device and presenting a message on a display of the first device indicating that the active session is active on the second device;

re-establishing a suspended session on the first device by transferring the active session from the second device back to the first device.

18. A system, comprising:

a target device having memory configured with a device session manager, the device session manager processing on the target device; and a server having memory configured with a server session manager;

wherein the target device is configured to capture a token within a configured proximity from an active session between a principal and a resource occurring on an original device and communicate the token to the server session manager, the server session manager configured to validate the token and the target device when received from the target device and interact with the resource to migrate the active session from the original device to the target device, and wherein the server session manager configured to generate the token captured by the target device, and the token include restrictions for a time to live and a scope of access with respect to the active session, and wherein the target device is a mobile device, and wherein the server session manager is further configured to authenticate the principal from a different device than the target device and provide an interface for the principal to deregister the target device for access to the active session or other subsequent active sessions.

19. The system of claim 18, wherein the server session manager is further configured to inject the token into the active session for discovery by the target device within the configured proximity.

* * * * *